United States Patent [19]

Keyser, Jr. et al.

[11] Patent Number: 5,603,511
[45] Date of Patent: Feb. 18, 1997

[54] EXPANDABLE SEAL ASSEMBLY WITH ANTI-EXTRUSION BACKUP

[75] Inventors: William F. Keyser, Jr., Willis; Merle L. Bell, New Waverly; Ronney P. Edwards, Richardson; Weston W. Woods, Houston, all of Tex.

[73] Assignee: Greene, Tweed of Delaware, Inc., Wilmington, Del.

[21] Appl. No.: 514,161

[22] Filed: Aug. 11, 1995

[51] Int. Cl.$^6$ .................................................. F16J 15/00
[52] U.S. Cl. .................... 277/115; 277/116.6; 277/163; 277/164; 277/188 A
[58] Field of Search .................... 277/164, 188 A, 277/157, 163, 162, 116.2, 115, 116.6, 116.4, 218, 116.8, 121; 166/138

[56] References Cited

U.S. PATENT DOCUMENTS

| | | |
|---|---|---|
| 2,590,245 | 3/1952 | Harbison . |
| 2,602,513 | 7/1952 | Conrad . |
| 2,603,294 | 7/1952 | Barnes . |
| 2,657,101 | 10/1953 | Williams . |
| 2,885,009 | 5/1959 | Baker ................... 277/116.2 |
| 3,038,542 | 6/1962 | Loomis ................. 277/116.2 |
| 3,109,493 | 11/1963 | Carter ................... 277/116.2 |
| 3,278,192 | 10/1966 | Tamplen ................ 277/116.2 |
| 3,559,733 | 2/1971 | Kilgore ................. 277/116.2 |
| 4,059,280 | 11/1977 | Eastwood ............... 277/165 |
| 4,109,716 | 8/1978 | Canalizo . |
| 4,403,660 | 9/1983 | Coone . |
| 4,809,989 | 3/1989 | Kernal ................... 277/164 |
| 4,993,489 | 2/1991 | McLeod . |
| 5,014,603 | 5/1991 | Navarette et al. ....... 277/164 |
| 5,311,938 | 5/1994 | Hendrickson . |
| 5,433,269 | 7/1995 | Hendrickson . |

*Primary Examiner*—Daniel G. DePumpo
*Attorney, Agent, or Firm*—Panitch Schwarze Jacobs & Nadel, P.C.

[57] ABSTRACT

An annular expandable seal assembly is disclosed for being packed between inner and outer cylindrical walls. The seal assembly has an annular expandable elastomeric seal element, an annular non-elastomeric anti-extrusion element, and an arcual non-elastomeric anti-extrusion bridge element. The seal element has opposing inner and outer axial surfaces and opposing first and second radial surfaces. The anti-extrusion element is coaxially positioned at the first radial surface and has a toroidal gap. The bridge element is positioned between the seal element and the anti-extrusion element in alignment with the toroidal gap. The seal assembly is set by being expanded so that the inner and outer surfaces respectively sealingly contact the inner wall and the outer wall, the toroidal gap expands, and the anti-extrusion element and the bridge element contact the outer wall. When pressure is applied to the set seal assembly adjacent the second radial surface, the anti-extrusion element and the bridge element together function as a backup to prevent seal element extrusion at the outer wall.

13 Claims, 2 Drawing Sheets

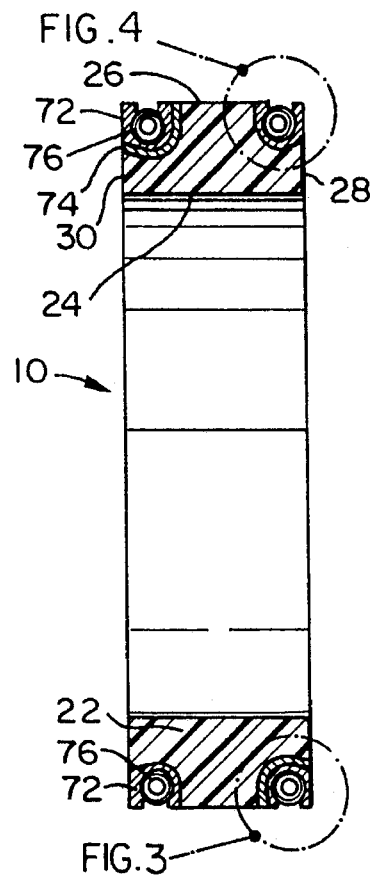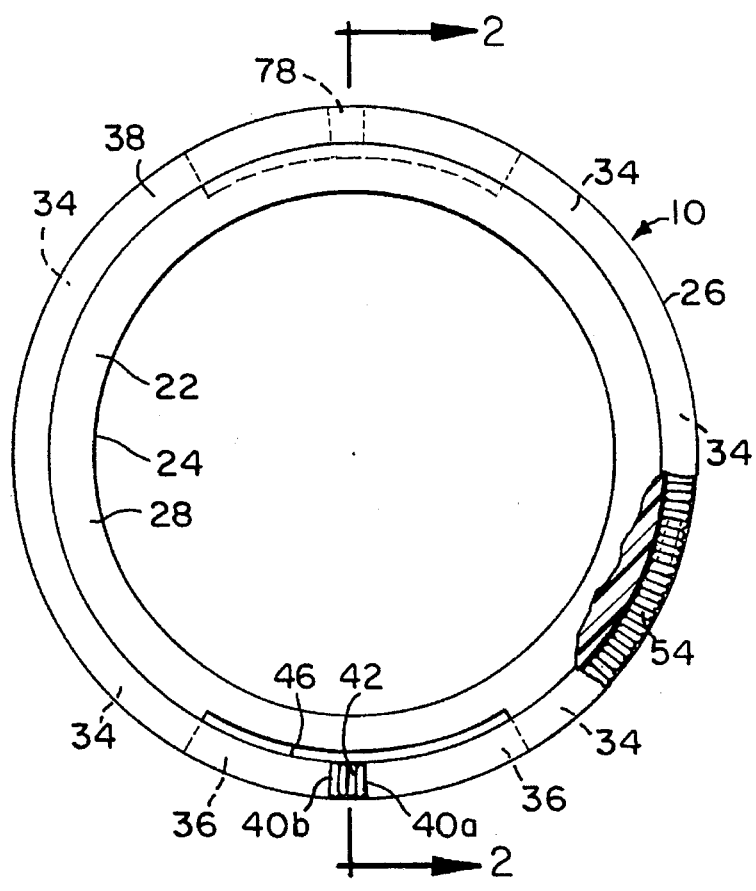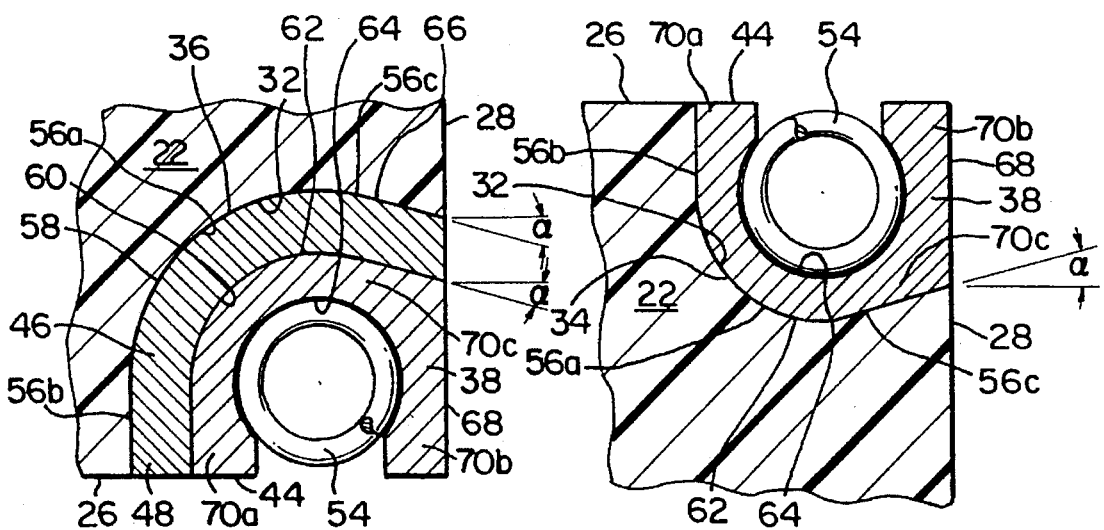

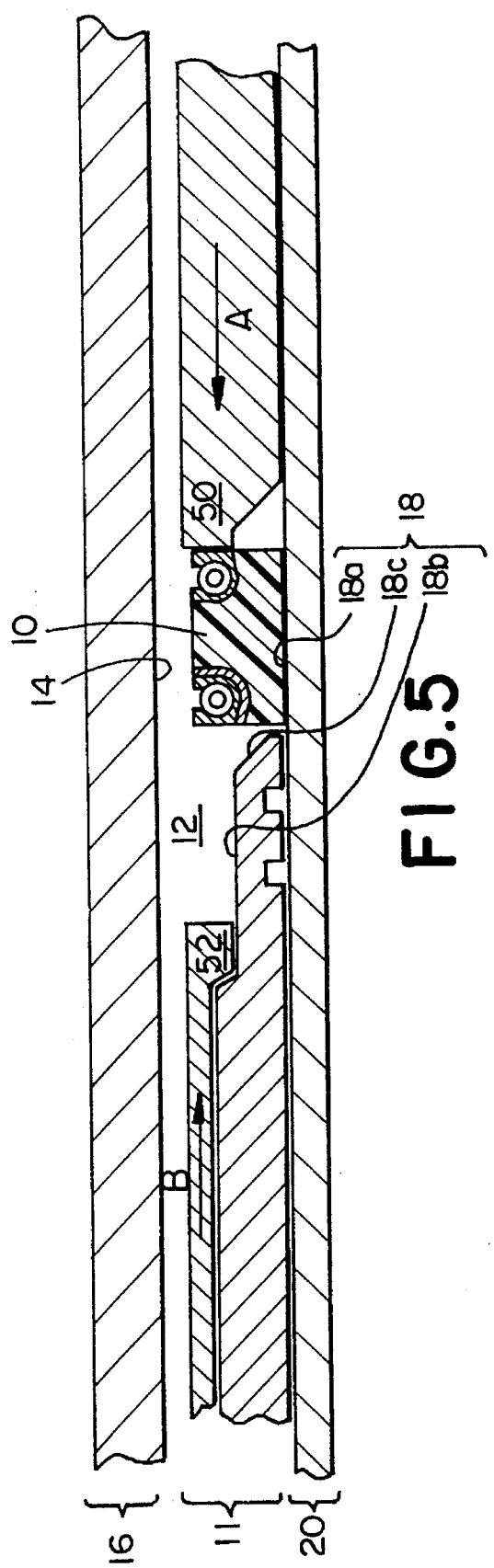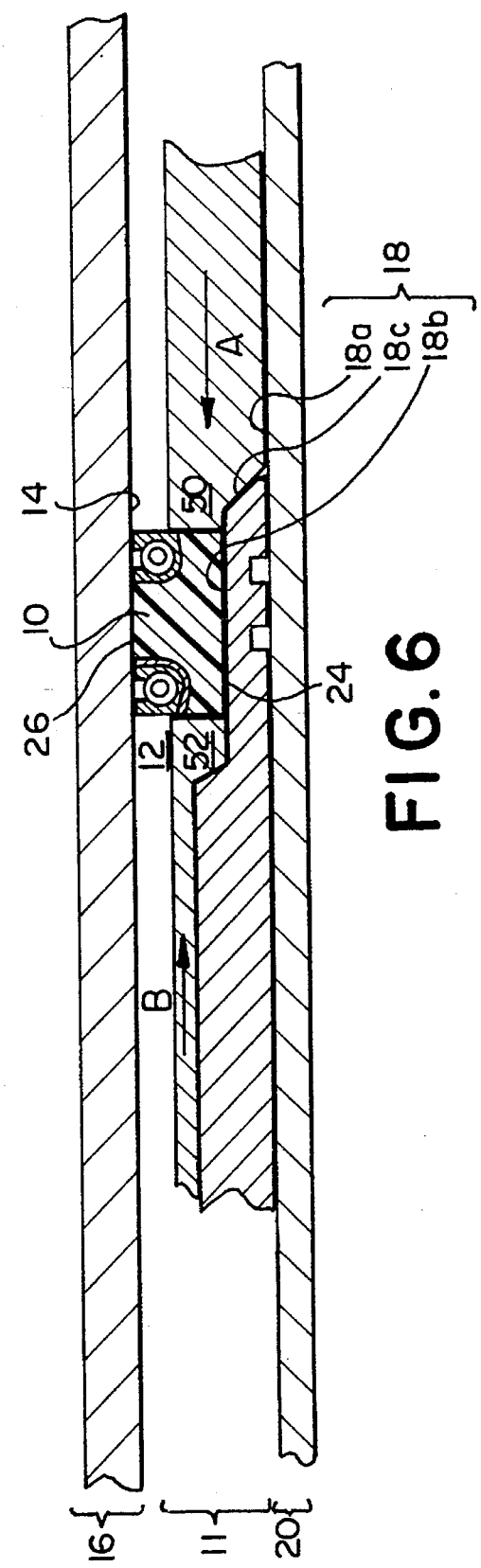

EXPANDABLE SEAL ASSEMBLY WITH ANTI-EXTRUSION BACKUP

BACKGROUND OF THE INVENTION

The present invention relates generally to an expandable seal assembly for releasably sealing an annulus between the exterior of a cylindrical object and a bore of a surrounding casing or wall, and more particularly, to an expandable seal assembly having a seal element and an anti-extrusion backup in contact with the surrounding casing to prevent seal element blowout at the casing or wall.

As is explained in U.S. Pat. No. 5,311,938, hereby incorporated by reference, in the course of treating and preparing subterranean wells for production, a well packer is run into the well on a work string or a production tubing. As should be understood, the packer supports production tubing and other completion equipment such as a screen adjacent to a producing formation, and also seals the annulus between the outside of the production tubing and the inside of a well casing or wall to block movement of fluids through the annulus past the packer location. The packer carries an annular seal assembly which includes a seal element that is radially expanded or "set" into sealing engagement against the bore of the well casing in response to an axial compression force either hydraulically or mechanically exerted by the packer.

A seal assembly that has been set and sealed against the well casing bore must maintain sealing engagement even at high temperatures and high pressures on the order of 325 degrees Fahrenheit and 10,000 PSI, respectively. Such conditions are typical in deep wells, and may also be experienced from mechanical and/or hydraulic pressures applied externally or internally from the formation and/or manipulation of the tubing string and service tools. Moreover, the seal assembly should be able to withstand variations of externally applied pressures at levels up to as much as 10,000 psi in both directions, and still be retrievable after exposure for long periods, for example, from ten to fifteen years or more.

It is known in the prior art to use a retrievable seal assembly that includes a seal element and metal backup rings or shoes that engage the casing wall to prevent seal element extrusion and/or blowout at the casing wall. However, and as should be understood, such engaging metal backup shoes create a drag during the setting and releasing of the seal assembly, and such drag requires the exertion of considerable additional force during such setting and releasing. Moreover, if the seal assembly is improperly set or if the metal backup rings become disengaged from the seal assembly during setting, a leakage passage may develop across the seal assembly and the seal element in the seal assembly may experience extrusion and/or blowout at the casing wall. Overall, such a prior art seal assembly and all other prior art seal assemblies have been found to work poorly.

A need exists, then, for a retrievable seal assembly having an anti-extrusion backup that does not create a drag during the setting and releasing of the seal assembly, that prevents seal element extrusion and/or blowout at the casing wall and the resultant leakage, that maintains a reliable seal between the tubing string and the well casing, and that performs satisfactorily overall.

SUMMARY OF THE INVENTION

The aforementioned need is satisfied by a generally annular expandable seal assembly that is packed or "set" into a generally cylindrical space defined by an inner cylindrical wall and an outer cylindrical wall. The seal assembly has a generally annular expandable seal element, a generally annular anti-extrusion element, and a generally arcual anti-extrusion bridge element.

The seal element is formed from an elastomeric material and has opposing inner and outer generally axial surfaces and opposing first and second generally radial surfaces. The anti-extrusion element is formed from a non-elastomeric material, is generally-coaxial with the seal element, and has first and second adjacent toroidal ends that define a toroidal gap. The anti-extrusion element is positioned at the first radial surface adjacent the outer surface of the seal element such that a radially outermost portion of the anti-extrusion element is substantially co-extensive with the outer surface.

The bridge element is formed from a non-elastomeric material, has a radially outermost portion that is substantially co-extensive with the outer surface of the seal element, and is positioned between the seal element and the anti-extrusion element generally in alignment with the toroidal gap. The seal assembly is set by being expanded so that the inner surface of the seal element sealingly contacts the second portion of the inner wall, the outer surface of the seal element sealingly contacts the outer wall, the toroidal gap in the anti-extrusion element expands, and the anti-extrusion element and the bridge element contact the outer wall. Accordingly, when pressure is applied to the set seal assembly adjacent the second radial surface, the anti-extrusion element and the bridge element together function as a backup to prevent extrusion of the seal element at the outer wall.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 1 is a plan view of a seal assembly constructed in accordance with a preferred embodiment of the present invention;

FIG. 2 is a cross-sectional view of the seal assembly taken along the line 2—2 in FIG. 1;

FIGS. 3 and 4 are enlarged fragmentary views of portions of the seal assembly shown in FIG. 2;

FIG. 5 is a schematic toroidal cross-sectional view of the seal assembly of FIG. 1 in a run position within a well casing and a well packer; and FIG. 6 is a schematic toroidal cross-sectional view similar to FIG. 5 with the seal assembly in a set position.

DETAILED DESCRIPTION OF PREFERRED EMBODIMENTS

Certain terminology may be used in the following description for convenience only and is not limiting. The words "left", "right", "upper", and "lower" designate directions in the drawings to which reference is made. The words "inwardly" and "outwardly" are further directions toward and away from, respectively, the geometric center of a referenced object. The terminology includes the words above specifically mentioned, derivatives thereof, and words of similar import.

Referring to the drawings in detail, wherein like numerals are used to indicate like elements throughout, there is shown in FIG. 1 an expandable seal assembly 10 constructed in accordance with a preferred embodiment of the present invention. As should be understood, and as seen in FIGS. 5 and 6, the seal assembly 10 is for being packed or "set" by a well packer assembly 11 into a generally cylindrical space 12 defined by an outer cylindrical wall 14 associated with a well casing 16 and an inner cylindrical wall 18 associated with the well packer assembly 11 and a tubing string 20. As shown, the inner wall 18 includes a first axial portion 18a with a first diameter and a second axial portion 18b with a second diameter greater than the first diameter. Additionally, a ramp 18c may be provided on the inner wall 18 between the first and second axial portions 18a, 18b.

As seen in FIGS. 5 and 6, the well packer assembly 11 typically includes a setting ring 50 and a releasing ring 52. As should be understood, the seal assembly 10 is set by mechanically or hydraulically actuating the setting ring 50 to move the seal assembly 10 in a first axial direction shown by the arrow A from the run position shown in FIG. 5 to the set position shown in FIG. 6. Similarly, the seal assembly 10 is released by mechanically or hydraulically actuating the releasing ring 52 to move the seal assembly 10 in the second axial direction shown by the arrow B from the set position shown in FIG. 6 to a release position substantially corresponding to the run position shown in FIG. 5.

Well packers are conventional and per se form no part of the present invention. Further description of a typical well packer and the method and means for setting and releasing seal assemblies may be found in the aforementioned U.S. Pat. No. 5,311,938.

Referring now to FIGS. 1 and 2, the seal assembly 10 includes a generally annular expandable seal element 22. Preferably, the seal element 22 is formed from an elastomeric material such as NBR, FKM, or the like. However, one skilled in the art will recognize that depending upon the temperatures and pressures to be experienced by the seal assembly 10, other similar materials may be employed without departing from the spirit and scope of the present invention. Depending upon the material chosen, the seal element 22 may be molded, cast, machined, stamped, extruded, or a combination thereof.

As seen, the seal element 22 has opposing inner and outer generally axial surfaces 24, 26 and opposing first and second generally radial surfaces 28, 30. Preferably, and as seen in FIG. 2, each of the first and second radial surfaces 28, 30 meets the inner axial surface 24 at respective junctures. However, one skilled in the art will recognize that an intervening surface may be interposed between the first radial surface 28 and the inner axial surface 24 and/or the second radial surface 30 and the inner axial surface 24 without departing from the spirit and scope of the present invention.

It is also preferable that the first and second radial surfaces 28, 30 be generally planar, as shown in FIG. 2. One skilled in the art will recognize, though, that the first and second radial surfaces 28, 30 may exhibit any of a number of other acceptable geometries, including an annular concavity, an annular convexity, or any of a number of other patterns, without departing from the spirit and scope of the present invention.

As best seen in FIG. 5, the inner surface 24 of the seal element 22 has a third, unpacked diameter (i.e. when in the "run" position) which is less than the second diameter of the second axial portion of the inner wall 18b. As can be appreciated, the seal element 22 is expanded or "set" by being moved from the run position at the first axial portion 18a up the ramp 18c to the "set" position at the second axial portion 18b.

As best seen in FIGS. 3 and 4, it is preferable that the seal element 22 also include a first annular recessed surface 32 interposed between the first radial surface 28 and the outer surface 26. The first recessed surface 32 is recessed both toward the inner surface 24 and the second radial surface 30 in a generally inwardly rounded or curved manner. Preferably, the first recessed surface 32 includes a first arcual portion 34 (FIG. 4) and a second arcual portion 36 (FIG. 3) which is at least slightly more recessed than the first arcual portion 34.

As best seen in FIG. 1, the first arcual portion 34 extends around the seal element 22 an arc length of about 300 degrees and the second arcual portion 36 extends the remaining arc length of about 60 degrees. However, one skilled in the art will recognize that the respective arc lengths of the first and second arcual portions 34, 36 may differ without departing from the spirit and scope of the present invention.

The seal assembly 10 includes a first generally annular anti-extrusion element 38 which is positioned generally coaxial with respect to the seal element 22. As best seen in FIG. 1, the first anti-extrusion element 38 is toroidally split and has first and second adjacent toroidal ends 40a, 40b which define a toroidal gap 42 therebetween. As shown in FIGS. 2–4, the first anti-extrusion element 38 is positioned adjacent the outer surface 26 of the seal element 22 such that a radially outermost portion 44 of the element 38 is substantially co-extensive or flush with the outer surface 26 such that the seal assembly 10 has a generally flush outer axial surface.

Preferably, the first anti-extrusion element 38 is constructed of a relatively hard, non-elastomeric material such as PEEK or the like. However, one skilled in the art will recognize that depending upon the temperatures and pressures to be experienced by the seal assembly 10, other similar materials may be employed without departing from the spirit and scope of the present invention. Depending upon the material chosen, the first anti-extrusion element 38 may be molded, cast, machined, stamped, extruded, or a combination thereof.

As best seen in FIGS. 1–3, the seal assembly 10 also has a first generally arcual anti-extrusion bridge element 46 positioned between the seal element 22 and the first anti-extrusion element 38. As shown, the first bridge element 46 is generally in alignment with the toroidal 42 of the first anti-extrusion element 38, and has a radially outermost portion 48 (FIG. 3) substantially co-extensive or flush with the outer surface 26 of the seal element 22 and the radially outermost portion 44 of the first anti-extrusion element 38 such that the seal assembly 10 has a generally flush outer axial surface.

Preferably, the first bridge element 46 has an arcual length substantially equal to the arcual length of the second arcual portion 36 of the first recessed surface 32 and a first principal surface 58 complementary to the second arcual portion 36 such that the first principal surface 58 is positioned adjacent to and substantially completely contacts the second arcual portion 36. Also preferably, the first bridge element 46 has a second, opposing principal surface 60 that is substantially co-extensive or flush with the first arcual portion 34 of the first recessed surface 32. Accordingly, the transition from the first arcual portion 34 to the second principal surface 60 is virtually unnoticeable and presents a substantially unvarying surface.

The first bridge element 46 is preferably formed from a non-elastomeric high shear resistant material such as steel, 9Cr 1Mo steel, stainless steel, or another similar material. However, one skilled in the art will recognize that depending upon the expected pressures and temperatures to be encountered by the seal assembly 10, other materials may be employed without departing from the spirit and scope of the present invention. Depending upon the material chosen, the first bridge element 46 may be molded, cast, machined, extruded, stamped, or a combination thereof.

As should now be understood, when the seal assembly 10 is moved in the first axial direction from the first portion 18a of the inner wall 18 (FIG. 5) to the second portion 18b (FIG. 6) by way of the ramp 18c, the seal element 22 expands so that the inner surface 24 sealingly contacts the second portion of the inner wall 18b and the outer surface 26 sealingly contacts the outer wall 14, and the toroidal gap 42 in the first anti-extrusion element 38 expands to accommodate the expansion of the seal element 22. Since the radially outermost portion 44 of the first anti-extrusion element 38 is substantially co-extensive or flush with the outer surface 26 of the seal element 22, the first anti-extrusion element 38 contacts the outer wall 14 of the cylindrical space 12 at the radially outermost portion 44 Similarly, since the radially outermost portion 48 of the first bridge element 46 is substantially co-extensive or flush with the outer surface 26 of the seal element 22, the first bridge element 46 contacts the outer wall 14 of the cylindrical space 12 at the radially outermost portion 48.

Accordingly, the first anti-extrusion element 38 prevents the seal element 22 from extrusion and/or blowout at the first arcual portion 34, and the first bridge element 46 prevents the seal element 22 from extrusion and/or blowout at the second arcual portion 34 and adjacent the toroidal gap 42. Thus, the first anti-extrusion element 38 and the first bridge element 46 together function as a backup to prevent extrusion and/or blowout of the seal element 22 along the entire circumference of the outer wall 14 when pressure is applied to the set seal assembly 10 adjacent the second radial surface 30.

As should be understood, the arcual length of the first bridge element 46 should be large enough to accommodate the maximum expansion of the toroidal gap 42 so that anti-extrusion backup is provided to all portions of the seal element 10 at such maximum expansion. Preferably, the ends 40a, 40b of the first anti-extrusion element 38 sufficiently overlap the first bridge element 46 at the maximum expansion of the toroidal gap 42 to ensure that the first bridge element 46 remains in position during such maximum expansion so that the first bridge element 46 can carry the sheer loading from system pressure in the area of the toroidal gap 42.

Preferably, and referring to FIGS. 3 and 4, the first and second arcual portions 34, 36 of the first recessed surface 32 when viewed in toroidal cross-section are generally inwardly rounded, the first principal surface 58 is generally outwardly rounded, and the second opposing principal surface 60 is generally inwardly rounded. More preferably, the first and second arcual portions 34, 36 both exhibit a first, inwardly rounded section 56a, a second, generally linear section 56b extending toward the outer surface 26 of the seal element 22, and a third, generally linear section 56c extending from the inwardly rounded portion 56a toward the first radial surface 28 of the seal element 22.

Preferably, and as seen in FIGS. 3 and 4, the first anti-extrusion element 38 has an exterior surface 62 and an interior surface 64 defining a generally annular chamber. As seen, at least a first portion 66 of the exterior surface is generally outwardly rounded and substantially completely contacts the second principal surface 60 of the first bridge element 46 and the first arcual portion 34 of the seal element 22, and at least a second portion of the exterior surface 62 is the radially outermost portion 44 of the first anti-extrusion element 38 and is, therefore, substantially co-extensive or flush with the outer surface 26 of the seal element 22. As also seen, at least a third portion 68 of the exterior surface 62 is substantially co-extensive or flush with the first radial surface 28 of the seal element 22 such that the seal assembly 10 has a generally flush radial surface. Accordingly, the first anti-extrusion element 38 forms a corner of the seal assembly 10, when the seal assembly 10 is viewed in toroidal cross-section.

More preferably, the first anti-extrusion element 38 in toroidal cross-section exhibits first and second generally radial leg sections 70a, 70b connected by a generally axially extending radially inward base section 70c such that a generally U-shaped cross-sectional image is viewed. Accordingly, the first leg section 70a and at least a portion of the base section 70c substantially completely contact the second principal surface 60 of the first bridge element 46 and the first arcual portion 34 of the seal element 22.

Preferably, and as seen in FIGS. 1–4, the seal assembly 10 also has a first generally annular biasing element 54 that is generally coaxial with the seal element 22. The first biasing element 54 is positioned adjacent the first anti-extrusion element 38 such that a generally radially inward force is provided on at least a portion of the first anti-extrusion element 38, the first bridge element 46, and the seal element 22. As seen, the first biasing element 54 is preferably positioned within the annular chamber defined by the interior surface 64 of the first anti-extrusion element, between the first and second leg sections 70a, 70b, and adjacent the base section 70c. As should be understood, the combination of the first anti-extrusion element 38, the first bridge element 46, and the first biasing element 54 provides an anti-extrusion backup having strength in shear to resist high pressures, and also provides a seal assembly 10 that is expandable and retractable as required.

Preferably, the first biasing element 54 is a garter spring assembly constructed of wound steel, wound nickel alloy, or the like. Also preferably, the garter spring assembly has two ends, one end being securely fitted within the other end. However, one skilled in the art will recognize that, depending upon the pressures and temperatures to be encountered by the seal assembly 10, other compressive elements may be employed, such as an elastomeric ring or the like, without departing from the spirit and scope of the present invention.

As may be understood, the radially inward force provided by the first biasing element 54 contracts the expanded toroidal gap 42 and the first anti-extrusion element 38 when the seal assembly 10 is moved in the second axial direction under the influence of the releasing ring 52. Moreover, the radially inward force provided by the first biasing element also prevents the first anti-extrusion element 38 and the first bridge element 46 from becoming separated from the seal assembly 10 during such releasing.

Preferably, the third section 56c of the first and second arcual portions 34, 36 is an angled section and the second principal surface 60 of the first bridge element 46 has a co-extensive or flush angled section. As seen, the angled sections extend at an acute angle α0 toward the outer wall 14 defining the cylindrical space 12. Preferably, the acute angle α is about 15 degrees. As should be understood, the combination of the angled sections and the radially inward force provided by the first biasing element urges the first ant-extrusion element 38 and the first bridge element 46 in and toward the second radial surface 30 and prevents such elements from becoming separated from the seal assembly 10 during the release of the seal assembly 10.

As best seen in FIG. 2, since the set seal assembly 10 may experience extreme temperatures and pressures from either side, it is preferable that the seal assembly 10 also have a second generally annular anti-extrusion element 72 positioned at the second radial surface 30 adjacent the outer surface 26 of the seal element 22, and a second generally arcual anti-extrusion bridge element 74 positioned between the seal element 22 and the second anti-extrusion element 72. Also preferably, the seal assembly has a second biasing element 76. Preferably, the second anti-extrusion element 72, the second bridge element 74, and the second biasing element 76 are respectively substantially similar to the first anti-extrusion element 38, the first bridge element 46, and the first biasing element 54 in all material respects. Accordingly, the second anti-extrusion element 72 and the second bridge element 74 together function as a backup to prevent extrusion of the seal element 22 when pressure is applied to the set seal assembly 10 adjacent the first radial surface 28.

Preferably, the second bridge element 74 has an arcual position with respect to the seal element that does not correspond to an arcual position of the first bridge element 46. As should be understood, if the first and second bridge elements 46, 74 are at corresponding arcual positions, the axial contact of the outer wall 14 with the outer surface 26 of the set seal element 22 at the arcual position is reduced. More preferably, and as seen in FIG. 1, the arcual position of the second bridge element 74 is generally opposite from the arcual position of the first bridge element 46 (i.e. about 180 degrees), and the toroidal gap 78 in the second anti-extrusion element 72 has an arcual position generally opposite from an arcual position of the toroidal gap in the first anti-extrusion element 38.

As one skilled in the art will recognize, the seal assembly 10 of the present invention is not limited to use in subterranean wells. Instead, the seal assembly 10 may also be used in any other arrangement where an annulus between the exterior of a cylindrical object and a bore of a surrounding casing or wall must be sealed without departing from the spirit and scope of the present invention.

As one skilled in the art will also recognize, the seal assembly 10 may be set and released by means other than the packer assembly 11 having the setting ring 50 and the releasing ring 52 for axially moving the seal assembly 10 between first and second diameter portions of the inner wall 18a, 18b. For example, the seal assembly 10 may also be set by axially compression, among other methods, without departing from the spirit and scope of the present invention.

From the foregoing description, it can be seen that the present invention comprises a new expandable seal assembly having an anti-extrusion backup that does not create a drag during the setting and releasing of the seal assembly, that prevents seal element extrusion and/or blowout at the casing wall and the resultant leakage, that maintains a reliable seal between a tubing string and a well casing, and that performs satisfactorily overall. It will be recognized by those skilled in the art that changes may be made to the above-described embodiments of the invention without departing from the broad inventive concepts thereof. It is understood, therefore, that this invention is not limited to the embodiments disclosed, but is intended to cover all modifications which are within the spirit and scope of the appended claims.

We claim:

1. A generally annular expandable seal assembly for being set into a generally cylindrical space defined by an inner cylindrical wall and an outer cylindrical wall, the seal assembly comprising:

a generally annular expandable seal element formed from an elastomeric material and having opposing inner and outer generally axial surfaces and opposing first and second generally radial surfaces, the seal element further having a first annular recessed surface extending between the first radial surface and the outer surface, the first recessed surface recessed toward the inner surface and the second radial surface and including a first arcual portion and a second arcual portion more recessed than the first arcual portion;

a first generally annular anti-extrusion element formed from a non-elastomeric material and generally coaxial with the seal element, the first anti-extrusion element having a toroidal gap, the first anti-extrusion element being positioned at the first radial surface adjacent the outer surface of the seal element such that a radially outermost portion of the first anti-extrusion element is substantially co-extensive with the outer surface; and a first generally arcual anti-extrusion bridge element formed from a non-elastomeric material and having a radially outermost portion substantially co-extensive with the outer surface of the seal element, the first bridge element further having a first principal surface substantially completely contacting the second arcual portion and a second opposing principal surface substantially co-extensive with the first arcual portion, the first anti-extrusion element further having an exterior surface and an interior surface defining a generally annular chamber, at least a first portion of the exterior surface substantially completely contacting the second principal surface of the first bridge element and the first arcual portion of the seal element, the first bridge element being positioned between the seal element and the first anti-extrusion element generally in alignment with the toroidal gap;

wherein the seal assembly is set by being expanded so that the inner surface sealingly contacts the inner wall and the outer surface sealingly contacts the outer wall, the toroidal gap in the first anti-extrusion element expands, and the first anti-extrusion element and the first bridge element contact the outer wall such that when pressure is applied to the set seal assembly adjacent the second radial surface, the first anti-extrusion element and the first bridge element together function as a backup to prevent extrusion of the seal element at the outer wall.

2. The seal assembly of claim 1 further comprising a first generally annular biasing element generally coaxial with the seal element, the first biasing element being positioned adjacent the first anti-extrusion element such that the first biasing element provides a generally radially inward force on at least a portion of the first anti-extrusion element, the first bridge element, and the seal element, wherein when the seal assembly is released from the expanded state, the radially inward force provided by the first biasing element contracts the expanded gap in the first anti-extrusion element and prevents the first anti-extrusion element and the first bridge element from becoming separated from the seal assembly.

3. The seal assembly of claim 1 wherein at least a second portion of the exterior surface of the first anti-extrusion element is substantially co-extensive with the outer surface of the seal element.

4. The seal assembly of claim 1 wherein the first recessed surface is generally inwardly rounded, the first principal surface of the first bridge element is generally outwardly rounded, and the second opposing principal surface of the first bridge element is generally inwardly rounded.

5. The seal assembly of claim 4 wherein the first anti-extrusion element in toroidal cross-section has first and second generally radial leg sections connected by a generally axially extending radially inward base section, the first leg section and at least a portion of the base section substantially completely contacting the second principal surface of the first bridge element and the first arcual portion of the seal element.

6. The seal assembly of claim 5 further comprising a first generally annular biasing element generally coaxial with the seal element, the first biasing element being positioned between the first and second leg sections and adjacent the base section of the first anti-extrusion element, the first biasing element for providing a generally radially inward force on at least a portion of the first anti-extrusion element, the first bridge element, and the seal element, wherein when the seal assembly is released from the expanded state, the radially inward force provided by the first biasing element contracts the expanded gap in the first anti-extrusion element and prevents the first anti-extrusion element and the first bridge element from becoming separated from the seal assembly.

7. The seal assembly of claim 6 wherein the first arcual portion of the seal element has an arcual angled portion adjacent the first radial surface and the second principal surface of the first bridge element has a co-extensive arcual angled portion, the angled portions extending at an acute angle toward the outer cylindrical wall of the cylindrical space, wherein when the seal assembly is released, the radially inward force provided by the first biasing element urges the first anti-extrusion element and the first bridge element away from the first radial surface.

8. The seal assembly of claim 7 wherein the acute angle is about 15 degrees.

9. The seal assembly of claim 1 wherein the inner cylindrical wall has a first axial portion with a first diameter and a second axial portion with a second diameter greater than the first diameter, wherein the inner surface of the seal element has an unpacked diameter less than the second diameter, wherein the seal assembly is moved in a first axial direction from the first portion of the inner wall to the second portion of the inner wall to set the seal assembly, the seal element being expanded so that the inner surface sealingly contacts the second portion of the inner wall and the outer surface sealingly contacts the outer wall, and wherein the seal assembly is moved in a second axial direction generally opposite the first axial direction to release the seal assembly.

10. The seal assembly of claim 1 further comprising:

a second generally annular anti-extrusion element formed from a non-elastomeric material and generally coaxial with the seal element, the second anti-extrusion element having a toroidal gap, the second anti-extrusion element being positioned at the second radial surface adjacent the outer surface of the seal element such that a radially outermost portion of the second anti-extrusion element is substantially co-extensive with the outer surface; and a second generally arcual anti-extrusion bridge element formed from a non-elastomeric material and having a radially outermost portion substantially co-extensive with the outer surface of the seal element, the second bridge element being positioned between the seal element and the second anti-extrusion element in alignment with the toroidal gap of the second anti-extrusion element;

wherein when the seal assembly is set, the toroidal gap in the second anti-extrusion element expands and the second anti-extrusion element and the second bridge element contact the outer wall such that when pressure is applied to the set seal assembly adjacent the first radial surface, the second anti-extrusion element and the second bridge element together function as a backup to prevent extrusion of the seal element at the outer wall.

11. The seal assembly of claim 10 wherein the second bridge element has an arcual position with respect to the seal element that does not correspond to an arcual position of the first bridge element.

12. The seal assembly of claim 11 wherein the arcual position of the second bridge element is generally opposite from the arcual position of the first bridge element.

13. The seal assembly of claim 10 wherein the toroidal gap in the second anti-extrusion element has an arcual position generally opposite from an arcual position of the toroidal gap in the first anti-extrusion element.

\* \* \* \* \*